UNITED STATES PATENT OFFICE.

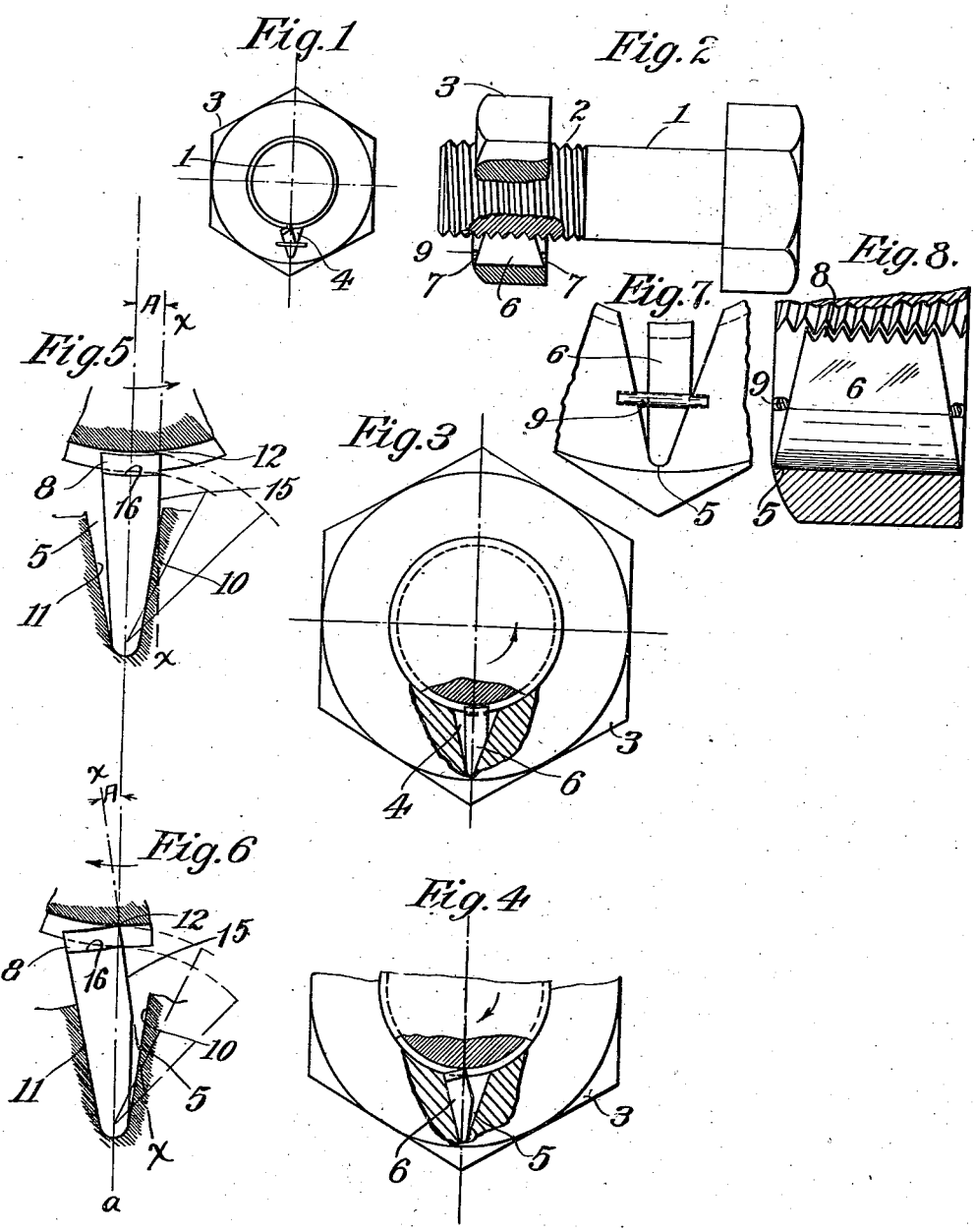

FRANK W. WOOD, OF NEW YORK, N. Y., ASSIGNOR, BY DIRECT AND MESNE ASSIGNMENTS, TO FLOATING WEDGE LOCK NUT CO. INC., A CORPORATION OF NEW YORK.

NUT-LOCK.

1,215,460.  Specification of Letters Patent.  Patented Feb. 13, 1917.

Application filed March 30, 1915, Serial No. 17,964. Renewed July 25, 1916. Serial No. 111,274.

*To all whom it may concern:*

Be it known that I, FRANK W. WOOD, a citizen of the United States, residing at New York, in the county and State of New York, have invented certain new and useful Improvements in Nut-Locks, of which the following is a full, clear, and exact description.

The invention which constitutes the subject matter of this application relates to nut locks, and has for one of its objects to provide simple and effective means for locking a nut against reverse movement except by proper manipulation on the part of the operator. With the nut lock wedges heretofore in use it has frequently been found that by exercising a little extra force on the nut in a reverse direction, the nut lock wedge would be so impaired as to entirely destroy its further utility. To this end it is a particular object to provide a nut lock wedge in which the same cannot be so impaired by reverse movement but in which the bolt or screw to be locked, rather than the nut lock wedge, is mutilated so that the nut lock wedge will always be efficient to engage a fresh surface of the screw and in which the nut lock wedge can only be disengaged to permit reverse movement of the bolt or screw by a proper manipulation of the nut lock wedge on the part of the operator.

Another important object of my invention consists in causing a positive lock between the bolt and nut, as distinguished from a mere frictional engagement, as soon as there is any tendency for either to recede longitudinally from the other. The nut lock wedges heretofore in use, have also been found not to be reliable in other respects. In certain positions of the bolt with such wedges, where the weight of the wedge would exercise a force opposite to the direction of the frictional force exercised by the screw the wedge would not engage with the screw, and furthermore, after short use, the teeth of such lock wedges would frequently be so impaired as to be useless.

It is one of the main objects of the present invention to provide a nut lock wedge of the character described whereby the foregoing defects will be overcome.

Other important objects and advantages will more fully appear from the detailed description below taken in connection with the accompanying drawing, in which, Figure 1 is an end view of the nut and bolt with the locking member in locking position.

Fig. 2 is a side view thereof with a part of the nut broken away to show the relative location of the nut and locking member thereon.

Fig. 3 is an enlarged view of Fig. 1 illustrating the inoperative position assumed by the locking member as the nut is being screwed upon the bolt.

Fig. 4 illustrates a view similar to Fig. 3 with the locking member in locking position.

Figs. 5 and 6 are enlarged fragmentary views of Figs. 3 and 4 respectively.

Figs. 7 and 8 are enlarged fragmentary views of Figs. 1 and 2, respectively.

Referring to the drawing in detail, the reference numeral 1 indicates a bolt of ordinary construction having screw-threads 2 at one end upon which a threaded nut 3, of suitable construction, is adapted to be screwed.

The nut is provided with a substantially V-shaped recess 4 tapering inwardly from its central bore and terminating in a seat or groove 5 which extends parallel to the axis of the nut and substantially from one end of the nut to the other. The V-shaped recess with its appropriate seat is adapted to receive the locking member which comprises a flange 6 with an inclined edge 7 at each end thereof. The thickness of the flange 6 preferably increases gradually as the distance from the axis decreases. The inner thicker end of the flange is provided with screw-threads 8 whose pitch substantially coincides with and forms, when in inoperative position, continuations of the screw-threads on the nut so that the nut may be screwed on and off the bolt at will.

The locking member only partially fills the recess and is so constructed that it has an oscillatory movement within said recess. When the nut containing the locking member is not in screw-threaded connection with the bolt the locking means would fall out, but to obviate this the nut containing the same, is provided with pins 9 placed in front of the inclined edges 7, which effectively maintains the locking member in place. The inclination of the edge is very slight and just sufficient to prevent the lock member from falling from the nut. The front edge 15 of the flange or wedge 6 is substantially perpendicular to a line tangential to the point of intersection between the curved threads 8 of the flange 6 and such edge 15. By this means when the wedge is swung over into locking position as particularly shown in Figs. 4 and 6, the edge 15 will be disposed in the line x—x which is inclined to the line A drawn through the center of the screw 1 to be engaged, and thereby the crests of the engaging teeth would not be impaired by the troughs of the screw 1 and the troughs 16 of the engaging teeth would be in their extreme biting engagement with the crests of the screw 1.

When the nut is being screwed on to the bolt the locking member, owing to the friction between the threads thereon and the threads on the member not supporting it, will be oscillated to one extreme position in the recess 4. In this particular position the threads on said locking member will be in alinement with the threads on the member supporting it and the latter will be free to be screwed in place. The locking member is so pivoted, however, that when there is any tendency for the nut to be screwed in the reverse direction the said member will be oscillated in the other direction which will bring it into locking engagement with the bolt. To remove the nut from the bolt it is necessary to hold the locking member in such position that the threads thereon are in perfect alinement with the threads on the nut and this may be done by the finger nail or any other suitable tool.

As ordinarily constructed nut locks of this construction depend entirely upon a frictional engagement between the threads of the locking member and the threads of the bolt. In my device I have provided for a positive lock against reverse movement of the nut. Referring particularly to Figs. 5 and 6 it will be seen that in its operative position the locking member lies against the side 10 of the recess, whereas in locking position the locking member approaches and is finally moved against the side 11 of the recess. In moving to this position the point 12 of the locking member moves to the left (as shown in Fig. 6) and acts in conjunction with the bolt and the locking member as a toggle, the theoretical pivot of which is at the point 12, so that as the point 12 approaches a line passing through the centers of rotation of the bolt and locking member the pressure between the bolt and said point is continually being multiplied and being, as it is, a point or a line there will be produced a gouging action upon the bolt. This gouging action increases until the point 12 reaches the line which passes through the centers of rotation of the locking member and the bolt and at this point of maximum pressure the locking member contacts with the side 11 of the recess and holds the same from further movement. Any tendency now to continue the unscrewing movement of the nut and bolt from each other will be overcome. If the force is sufficient of course it will result in a compressive and shearing action between the points 12 and the coöperating surfaces of the threads on the bolt but as there is a number of such points it will be clear that in ordinary use no such force to separate the nut and bolt is ever found to exist.

If desired, as soon as the nut is screwed home, it may be given a slight reverse movement in order to cause the wedge member to positively engage the bolt by gouging it slightly, as shown in Fig. 6, thereby furnishing a permanently locking set between the said wedge and bolt which I have found in practice is not overcome by those vibratory and other forces which tend to loosen the nuts.

What I claim is:

1. A nut lock comprising a nut of the character described having a V-shaped recess therein, and a V-shaped rocking member of less width than the said recess and having a face at the inner end threaded to register with the thread on the nut when in the unlocked position of said locking member, said rocking member adapted to engage one of the walls of the recess when in the unlocked position, the locking member having one edge substantially perpendicular to the tangential line extending through the point of intersection between said threads of the rocking member and such edge and adapted to form a toggle action with the bolt and to engage the other wall of the recess when in locked position.

2. A bolt nut the threaded bore of which is formed with a gap the walls of which converge in the direction of the periphery of the nut in combination with a locking member laterally movable in the gap, and comprising a wedge-shaped member having threads on its enlarged end and one edge substantially perpendicular to a tangential line passing through the point of intersection between said edge and said threads, the bolt and the locking member constituting a toggle the theoretical pivot of which toggle is at the upper end of said locking member whereby a gouging action is effected by said locking member upon the bolt when the nut is moved relatively to the bolt in the reverse direction, said gap and said locking member so constructed that the latter contacts with and is limited in its movement by one of the walls of the former when the axis of the bolt, the center of oscillation of the locking member and the theoretical center of the toggle are substantially located in the same straight line and a line passing through the perpendicular edge of said locking member will be inclined to said straight line.

3. A bolt nut the threaded bore of which is formed with a gap the walls of which converge in the direction of the periphery of the nut, in combination with a locking member laterally movable in the gap and having means coöperating with means on the nut for maintaining said member in said gap, the rocking member comprising a wedge-shaped member having threads on its enlarged end and one edge substantially perpendicular to a tangential line passing through the point of intersection between said edge and said threads, the thread portions at the perpendicular edge constituting the engaging teeth of the wedge, the bolt and the said locking member constituting a toggle the theoretical pivot of which toggle is substantially at one of the upper corners of said locking member whereby a gouging action is effected between the crests of the threads of said nut and the troughs of the engaging teeth of said wedge when the nut is reversely moved relatively to the bolt.

In testimony whereof I affix my signature in the presence of two subscribing witnesses.

FRANK W. WOOD.

Witnesses:
M. LAWSON DYAR,
WM. BOHLEBER.